United States Patent [19]

Wang

[11] Patent Number: 4,611,693
[45] Date of Patent: Sep. 16, 1986

[54] CALIPER DISC BRAKE

[75] Inventor: Nui Wang, Sydney, Australia

[73] Assignee: Girlock Limited, Belmore, Australia

[21] Appl. No.: 559,649

[22] Filed: Dec. 9, 1983

[30] Foreign Application Priority Data

Dec. 23, 1982 [AU] Australia .............................. PF7404

[51] Int. Cl.⁴ ............................................. F16D 65/09
[52] U.S. Cl. .............................. 188/73.34; 188/73.39;
188/73.43
[58] Field of Search ............... 188/73.34, 73.38, 73.39,
188/73.44, 73.43, 73.31, 73.32, 73.45, 73.33,
73.35–73.37, 73.1, 250 B, 234, 242, 71.1

[56] References Cited

U.S. PATENT DOCUMENTS

| | | | |
|---|---|---|---|
| 3,285,371 | 11/1966 | Cadiou | 188/73.32 |
| 3,500,967 | 3/1970 | Nolan | 188/250 B X |
| 3,831,717 | 8/1974 | Flaherty | 188/73.35 X |
| 4,106,595 | 8/1978 | Kimura et al. | 188/73.45 |
| 4,209,083 | 6/1980 | Gerard | 188/73.32 |
| 4,243,123 | 1/1981 | Wantanabe | 188/73.38 |
| 4,335,806 | 6/1982 | Lupertz | 188/73.39 X |
| 4,509,619 | 4/1985 | Baynes et al. | 188/73.39 |

FOREIGN PATENT DOCUMENTS

| | | | |
|---|---|---|---|
| 521333 | 3/1982 | Australia . | |
| 0036368 | 9/1981 | European Pat. Off. | 188/73.32 |
| 1286845 | 1/1969 | Fed. Rep. of Germany | 188/73.31 |
| 2708317 | 9/1977 | Fed. Rep. of Germany | 188/73.44 |
| 0086929 | 7/1980 | Japan | 188/73.45 |

Primary Examiner—Bruce H. Stoner, Jr.
Assistant Examiner—Michael P. Gilday
Attorney, Agent, or Firm—Holman & Stern

[57] ABSTRACT

A sliding caliper disc brake including an anchor bracket adapted to be mounted in a fixed relation to a motor vehicle, the anchor bracket having a pair of facing slideways arranged substantially parallel to the axis of a disc with which the brake is to be used, inboard and outboard friction pads adapted to be brought into frictional contact with opposite faces of the disc, each pad being attached to a backing plate and each backing plate terminating at each end in an abutment portion slidable in one of said slideways and a caliper housing including at its inboard end a cylinder in which a piston is slidable, the piston being attached to the backing plate of the inboard pad, a bridge portion extending outwardly and having at its outboard end, attachment means attached to the backing plate of the outboard friction pad, the arrangement being such that on operation of the brakes, sliding motion of the backing plates is guided by the slideways on the anchor plate, wherein the shape of the slideways and the abutment portions of the backing plates are such as to permit the caliper housing together with the back plates to be partially rotated in relation to the anchor bracket about an axis adjacent and parallel to one of the slideways to permit removal and replacement of the friction pads and their backing plates.

6 Claims, 10 Drawing Figures

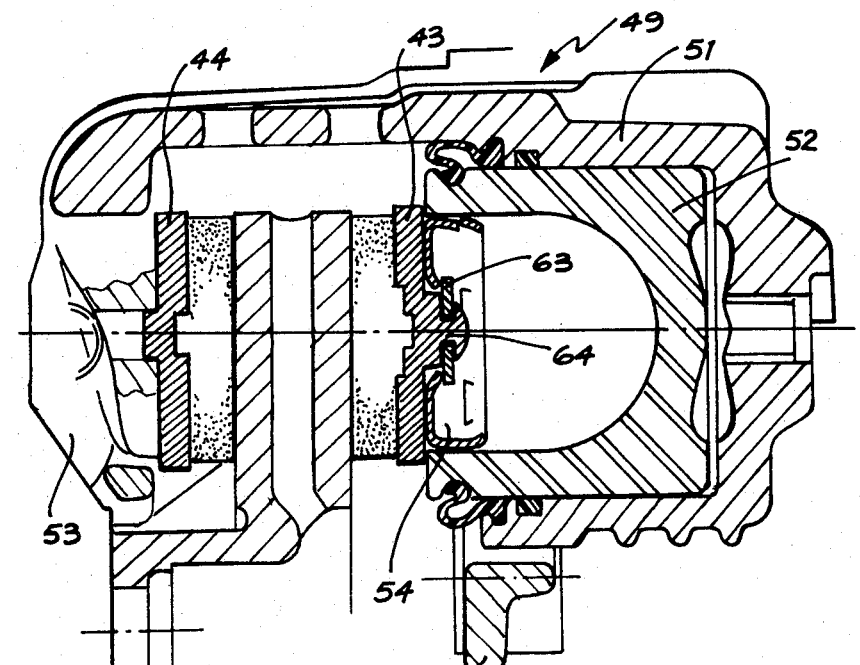
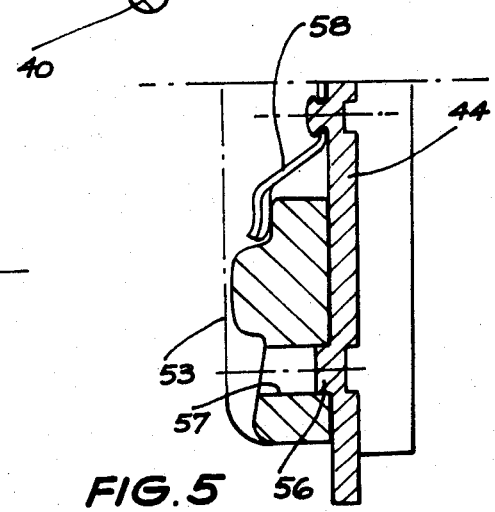
FIG. 4
FIG. 5

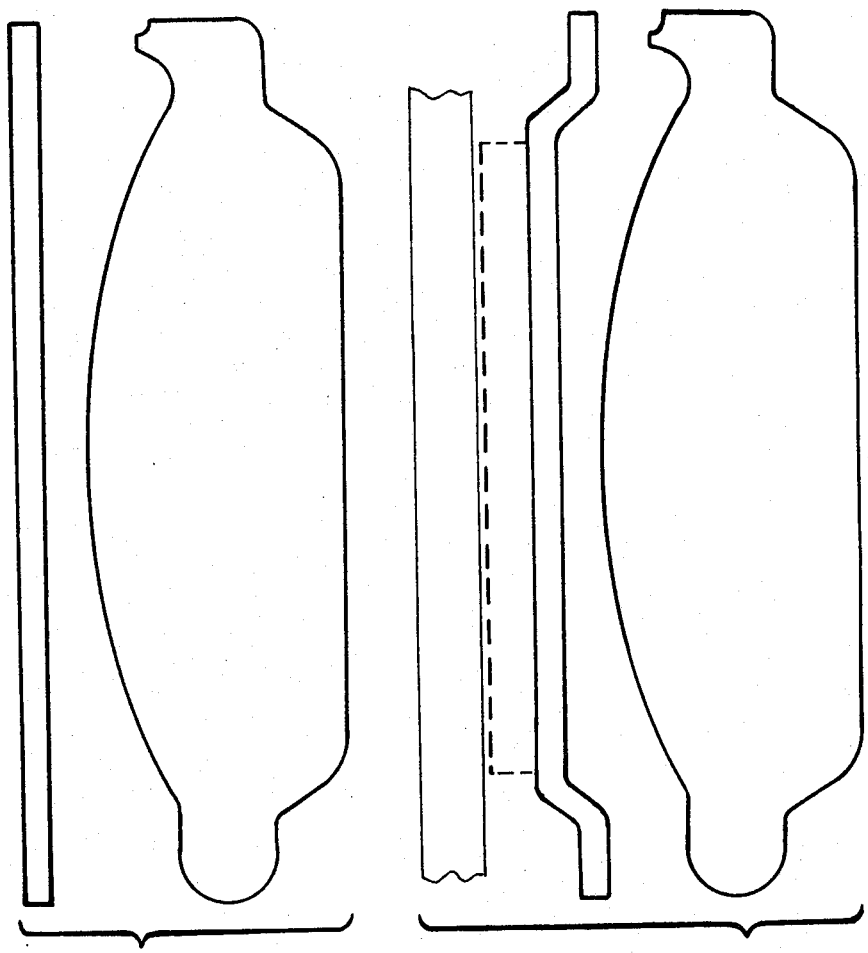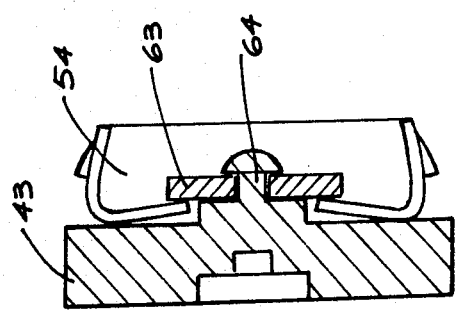

CALIPER DISC BRAKE

BACKGROUND OF THE INVENTION

1. Field of the Invention

The present invention relates to a pad slider caliper disc brake of the type which the current state of the art is, in essence, illustrated in FIGS. 1 and 2 of the accompanying drawings. In this type of brake, the pad back, or backing plates are slidingly fitted to an anchor bracket and a caliper housing is supported on the pad back plates.

2. Description of the Prior Art

In FIGS. 1 and 2 anchor bracket 20 is constructed for mounting to a motor vehicle. This has on it two slideways 21 which may typically be as drawn and which retain the ends of inboard back plate 23 and outboard back plate 24 so as to be slidable along the length of said slideways. To the inboard back plate 23 a friction pad 25 is attached and to the outboard back plate a friction pad 26 is attached. A caliper housing 27 includes a cylinder 28 at its inboard end which accommodates a piston 29, the outer face of piston 29 being attached to the inboard back plate 23. Extending from cylinder 28 is a caliper bridge 31 terminating in fingers 32 which are attached to the outboard back plate 24. Backplates 23 and 24 will typically be spring loaded to prevent rattling in service for example by two springs 34 and 35.

It is emphasized that FIGS. 1 and 2 are purely diagrammatic and are included only to illustrate the current state of the art.

Whilst the advantages of a pad slider caliper are known there are disadvantages with current designs which this invention seeks to improve upon. These disadvantages are described below.

The principal disadvantage that the present invention assists in overcoming is that the captive nature of the abutments of both back plates means that the housing/pad assembly cannot be simply unclipped and removed from the anchor bracket. In general, the most practical means of servicing the caliper, e.g., replacement of worn pads, is to unbolt the anchor bracket from the vehicle, remove it from its position over the disc 33 then proceed to dismantle the pads from the caliper housing. This problem is compounded by the fact that the inboard pad back plate is attached or keyed to the piston in some way, as is the outboard pad back plate to the fingers of the housing, thus making it difficult if not impossible to remove the caliper housing from the pads in situ.

Further disadvantages that are mitigated by optional features of the invention are firstly, the method of pad retention in general makes it difficult to design an anchor bracket with an integral outboard tie bar (not shown) because the limited space availability on many modern cars, precludes the incorporation of a tie bar and provision of sufficient clearance for pad removal. The anchor bracket must therefore be more robustly built in order to provide adequate stiffness, thus adding to the mass of the assembly.

Secondly, in current designs there is little provision for the take up of the accumulation of dimensional tolerances in the various components which could cause housing misalignment and consequent uneven pad wear and brakes-off drag. The prime cause of this is the lack of compliance in the connection between the inboard back plate and the piston and/or the connection between the outboard back plate and the caliper housing fingers. In general, such means is substantially rigid in a plane perpendicular to the piston axis. Hence, the caliper housing is forced to take up a position dictated by the sum of the tolerances of the interrelated components of the brake assembly and consequently will not necessarily be in correct alignment relative to the braking surfaces of the disc. Uneven, taper pad wear and brakes-off drag result.

Thirdly, in general, the spacing of the two pad back plates is narrow, relative to the overall depth of the caliper housing and becomes narrower as the pads wear. Due to the shape of the housing and the location of the piston, the center of gravity, of the housing assembly is offset inboard of the supporting back plates. The resulting cantilever effect tends to tilt the housing/pad assembly, with the resultant possibility of taper wear and brakes off drag.

BRIEF SUMMARY OF THE INVENTION

The application of the various features of the present invention results in improvements in the design of pad slider type caliper disc brakes, which simplify design, facilitate servicing, counter tendencies towards brakes-off drag, and improve mechanical stiffness.

The present invention consists in a sliding caliper disc brake including an anchor bracket adapted to be mounted in a fixed relation to a motor vehicle, the anchor bracket having a pair of facing slideways arranged substantially parallel to the axis of a disc with which the brake is to be used, inboard and outboard friction pads adapted to be brought into frictional contact with opposite faces of the disc, each pad being attached to a back plate and each back plate terminating at each end in an abutment portion slidable in one of said slideways and a caliper housing including at its inboard end a cylinder in which a piston is slidable, the piston being attached to the back plate of the inboard pad, a bridge portion extending outwardly and having at its outboard end, attachment means attached to the back plate of the outboard friction pad, the arrangement being such that on operation of the brakes, sliding motion of the back plates is guided by the slideways on the anchor plate, wherein the shape of the slideways and the abutment portions of the back plates are such as to permit the caliper housing together with the back plates to be partially rotated in relation to the anchor bracket about an axis adjacent and parallel to one of the slideways to permit removal and replacement of the friction pads and their back plates.

The present invention further consists in a back plate for a sliding caliper disc brake including an anchor bracket adapted to be mounted in a fixed relation to a motor vehicle, the anchor bracket having a pair of facing slideways arranged substantially parallel to the axis of a disc with which the brake is to be used, inboard and outboard friction pads adapted to be brought into frictional contact with opposite faces of the disc, each pad being attached to a back plate and each back plate terminating at each end in an abutment portion slidable in one of said slideways and a caliper housing including at its inboard end a cylinder in which a piston is slidable, the piston being attached to the back plate of the inboard pad, a bridge portion extending outwardly and having at its outboard end, attachment means attached to the back plate of the outboard friction pad, the arrangement being such that on operation of the brakes, sliding motion of the back plates is guided by the slideways on the anchor plate wherein the shape of the slideways and the abutment portions of the back plates are such as to permit the caliper housing together with the back plate to be partially rotated in relation to the anchor bracket about an axis adjacent and parallel to one of the slideways to permit removal and replacement of the friction pads and their back plates, wherein one of said slideways is part circular in internal profile when viewed in the direction of the axis of the disc, the back plate having an abutment portion at one end of a shape complementary with the internal profile of said one slideway to permit partial rotation of the back plate about an axis within said one slideway.

BRIEF DESCRIPTION OF THE DRAWINGS

In order that the invention may be better understood and put into practice the current state of the art is described with reference to FIGS. 1 and 2 wherein.

Figure 1:
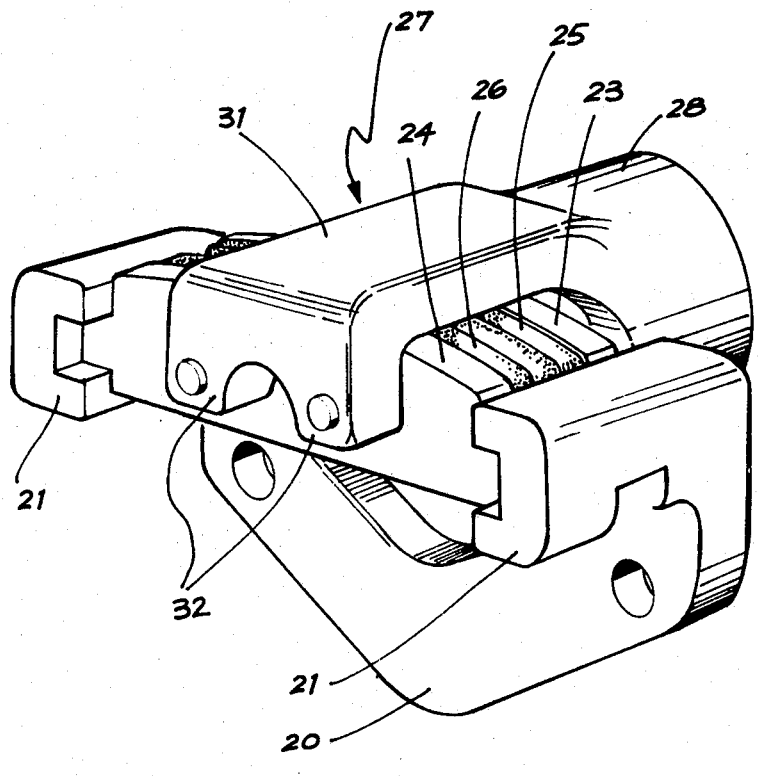
FIG. 1 is a purely diagrammatic perspective view of a pad slider type of caliper disc brake of known form; and, FIG. 2 is a partial top plan and horizontal cross-sectional view of the construction shown in FIG. 1.
Figure 2:
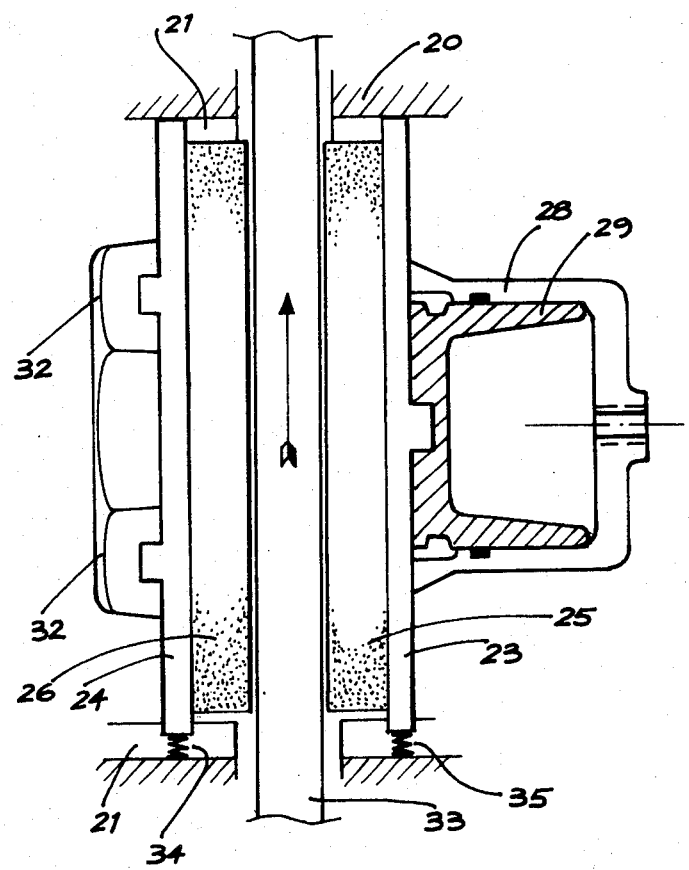
Figure 3:
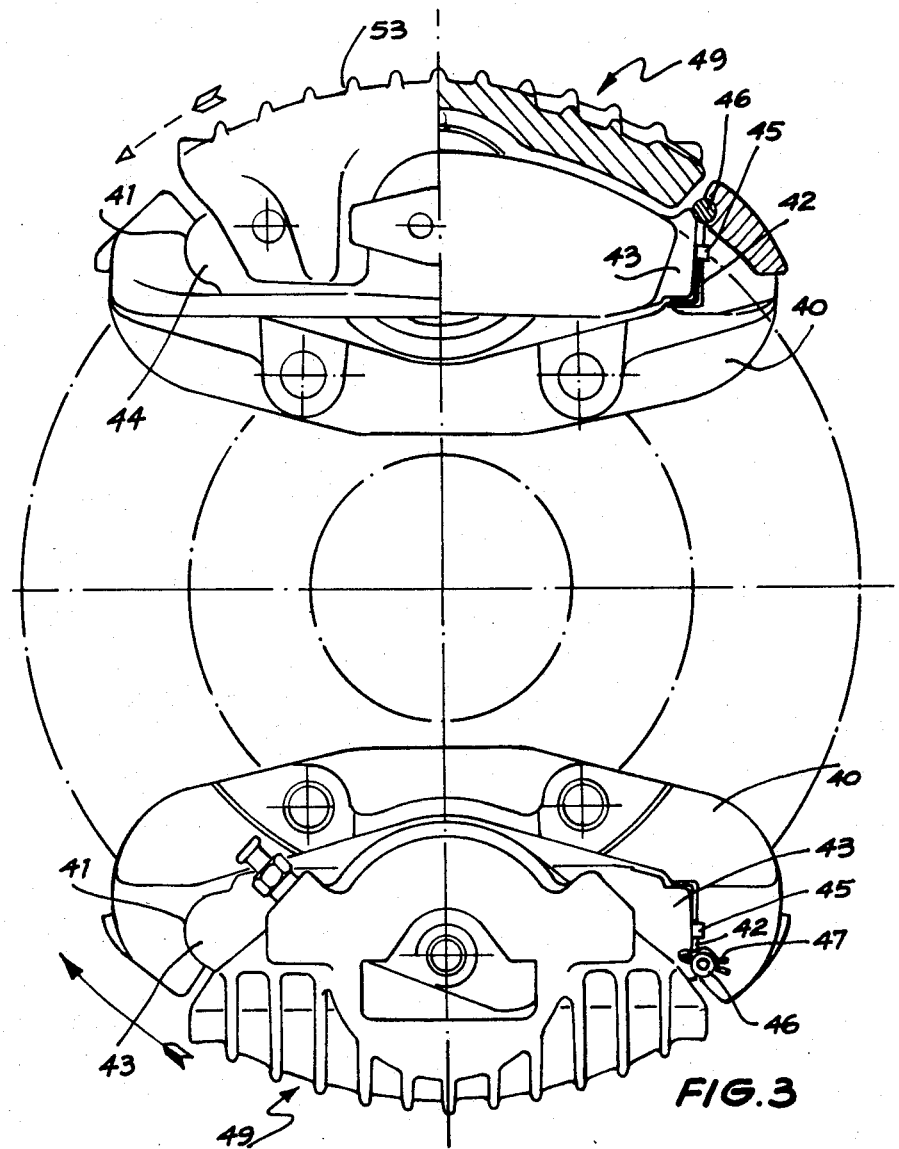
Figure 6A:
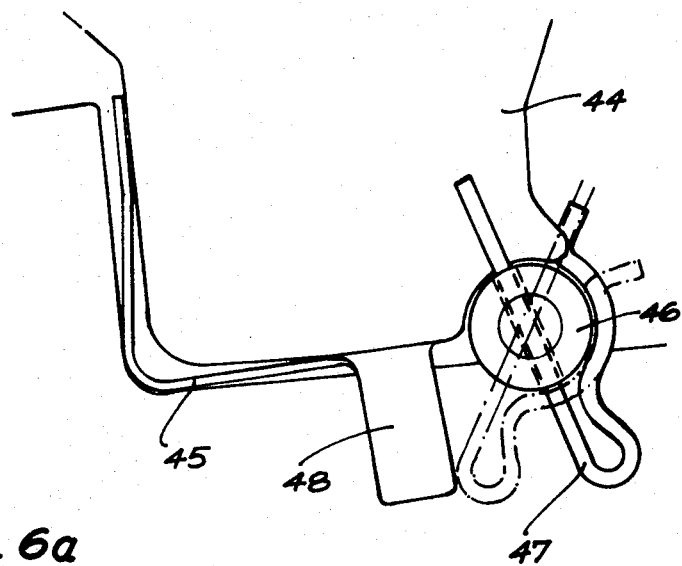
Figure 6B:
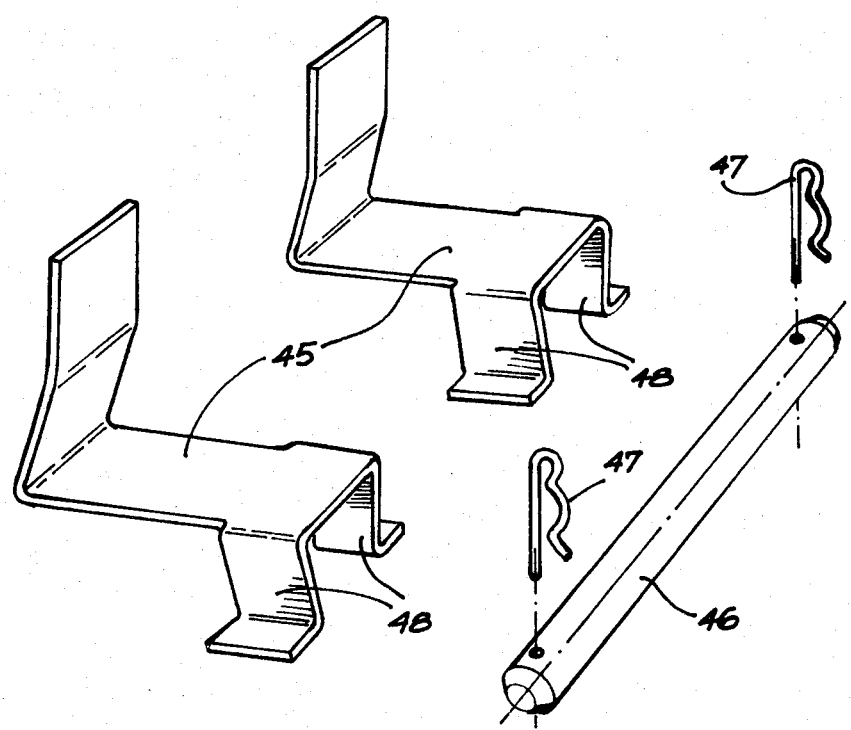

A preferred form of the invention is illustrated, by way of example, in the remaining figures of the drawings wherein:

FIG. 3 is an elevational view showing the general layout of a pad slider type of caliper disc brake according to the invention, the upper half showing the brake assembly from one side partly in cross-section and the lower half showing the assembly from the other side;

FIG. 4 is a cross-sectional view taken on line AA of FIG. 3;

FIG. 5 is a cross-sectional view through a caliper housing finger showing the method of securing the outer pad back plate to the finger;

FIGS. 6a and 6b are schematic assembly and exploded perspective views, respectively, showing the retention and bias means for the pad back plates;

FIG. 7 is a detail cross-sectional view of the means for retaining an inner pad back plate to the piston;

FIG. 8 is a side and front view of a typical back plate; and,

FIG. 9 is a view similar to FIG. 8 showing a back plate having offset ends by means of which the back plate spacing may be increased.

DETAILED DESCRIPTION

In the arrangement shown in FIGS. 3 and 4 an anchor bracket 40 with an outer connecting tie-bar is constructed for mounting to a motor vehicle. This has on it two slideways 41 and 42 on which are supported the ends of the inboard back plate 43 and the outboard back plate 44. Slideway 41 has a different profile from slideway 42 and consequently the ends of back plates 43 and 44 are shaped accordingly. As can be seen in FIG. 3, slideway 41 is of curved profile, when viewed in the direction of the axis of the disc and the abutting back plate end is essentially conjugately shaped to suit. The axis of curvature of slideway 41 and corresponding back plate ends are such that upon removal of any restraining means at the opposite slideway both inboard and outboard back plates 43 and 44 may be rotated, radially outwards from their service position and vice-versa. Thus, servicing of the brake assembly is greatly facilitated by the simplified removal procedure for the back plates 43, 44.

This feature of the construction is described in more detail below.

The pad back plates are biased in the direction of forward rotation towards the curved slideway 41 by means of the spring member 45 having legs 48 that is shown in an enlarged view in FIG. 6. In the arrangement shown in FIG. 3 the spring members 45 exert a thrust on each of the pad back plates both radially outwards and towards the opposite abutment. The radial outward force on each pad back plate is reacted by retaining pin 46 which is prevented from movement radially by the shape of the mating feature of the anchor plate and axially by retaining clips 47. Thus the pad back plates are held positively against vibration but are still capable of sliding in the slideways 41 and 42. The spring member 45, pin 46 and retaining clips 47 are shown in detail in FIGS. 6a and 6b.

The caliper housing 49 includes a cylinder 51 which accommodates a piston 52 and has at its outboard end fingers 53, the caliper housing 49 being supported entirely by the pad back plates 43 and 44. The inboard back plate 43 is connected to piston 52 by means of spring clip locator 54 and washer 63 shown in detail in FIG. 7.

The purpose of washer 63 is twofold. Firstly it provides a substantially positive axial connection between the inner pad back plate 43 and spring clip locator 54 and secondly it provides a friction slip joint normal to the piston axis which can support its portion of the caliper housing inertia weight but which on installation of the caliper housing/pad assembly to the vehicle, or upon initial application of the brakes, allows sufficient freedom for the caliper housing to find its own position thus ensuring correct alignment to the disc. In order that alignment can take place, spigot 64 is necessarily smaller in diameter than the diameter of the hole of spring clip 54 so that when assembled to each other a clearance exists between the two diameters. The height of the spigot 64 sets the preload on the slip joint. The outboard pad back plate 44 is connected to the caliper housing fingers 53 as shown in FIG. 5. Locating studs 56 on the outer face of back plate 44 fit into holes 57 in said fingers and retaining spring 58 holds pad back plate 44 against the inner face of said fingers.

This method of retention serves two purposes. Firstly in line with the principle of the pad slider caliper, the outer back plate serves as a support for the caliper housing 49 and secondly the particular means of retention imparts additional stiffness to the bridge of the caliper housing by positively restraining the natural tendency of the curved bridge section to straighten out when the caliper is loaded.

This design feature particularly favors bridges made of nonferrous alloys for which Young's Modulus is low compared with ferrous alloys.

For the purpose of minimizing the effect of caliper housing center of gravity offset, the ends of either or both inboard and outboard pad back plates may be offset away from the adjacent disc braking surface, essentially as shown in FIG. 9, thus increasing the support spacing and lessening the tendency for the assembly to tilt.

The features of the present invention may be applied with advantage in connection with the features of the invention which is the subject of Australian Pat. No. 521,333.

I claim:

1. A sliding caliper disc brake engageable with a disc rotatably mounted on a vehicle comprising:
   an anchor bracket adapted to be mounted in a fixed relation on a motor vehicle;
   a pair of relatively spaced slideways on said anchor bracket arranged facing each other and substantially parallel to the axis of the disc with which the brake is to be used;
   inboard and outboard friction pads having planar faces adapted to be brought into frictional contact with opposite faces of the disc;
   an inboard and an outboard backing plate attached in supporting relation to a respective friction pad, each backing plate having end portions each terminating in an abutment portion slidable in one of said slideways;
   a caliper housing having an inboard and an outboard portion on opposite sides of the disc;
   a cylinder in said inboard portion;
   a piston slidably mounted in said cylinder;
   an aperture in said piston opening through the end of the piston adjacent said inboard backing plate;
   a stepped projection on the surface of said inboard backing plate adjacent to said piston and projecting toward said piston having a first portion adjacent said surface and a second reduced size portion projecting from said first portion;
   connecting means for connecting said inboard backing plate to said piston comprising,
   a spring clip means having a central portion and an outer peripheral portion closely fitting in engaging relationship within said aperture to attach said clip to said piston,
   a hole in said central portion having a larger diameter than the outer dimension of said first portion of said projection to provide clearance between said hole and said first portion for permitting limited relative movement between said inboard backing plate and said piston in a direction parallel to the plane of the face of said inboard friction pad, and
   means to retain said clip on said inboard backing plate in the direction of movement of said piston; and
   attachment means on said outboard portion for attaching said outboard backing plate to said housing;
   so that said housing is supported solely on said backing plates and on operation of the brake actuating said piston to apply said friction pads on opposite sides of the disc, sliding motion of said backing plates is guided solely by said slideways on said anchor plate, and said inboard backing plate is positively attached to said piston against movement in the direction of movement of said piston to provide a spring-loaded friction slip joint, the spring loading generating sufficient friction against relative movement between said piston and said inboard backing plate to support a portion of said housing load while allowing sufficient movement of said housing with respect to said backing plate to allow said caliper housing to move to and remain in a position in which it is in correct alignment with the disc.

2. A sliding caliper disc brake as claimed in claim 1 wherein one of said slideways has a part circular concave internal profile when viewed in the direction of the axis of the disc and the abutment portion at one end of each backing plate has a complementary part circular convex shape to permit partial rotation of the caliper housing and backing plates about an axis within said one slideway, said abutment portions co-operating with said one slideway, so that the backing plates are held by the slideway in both radial and thrust directions during operation of the brake.

3. A sliding caliper disc brake as claimed in claim 2 wherein the other slideway is substantially flat and open sided at the radially outermost side thereof, so that the abutments of the backing plates slidable in said other slideway are free to rotate away from said other slideway, and restraining means are provided to prevent such rotation in service.

4. A sliding caliper disc brake as claimed in claim 3 wherein said restraining means comprises spring members shaped and arranged to exert a force on the backing plates in the direction of said one slideway and in a direction radially outward in relation to said disc and removable means engaging portions of the backing plates and the anchor bracket.

5. A sliding caliper disc brake as claimed in claim 1 wherein the caliper housing includes a curved bridge portion extending between the outboard portion and the cylinder, and said attachment means comprises spring means acting to prevent straightening of said curved bridge portion during operation of the brake.

6. A disc brake as claimed in claim 1 wherein:
   a circumferential slot is provided in the outer surface of said second portion of said projection; and
   said means to retain said spring clip on said inboard backing plate comprises a disc washer having a central hole engaging said slot to be retained therein, and said hole in the central portion of said spring clip has an edge frictionally engaging the side of said washer facing said inboard backing plate.

* * * * *